United States Patent [19]

Oriot et al.

[11] Patent Number: 4,569,810

[45] Date of Patent: Feb. 11, 1986

[54] APPARATUS AND METHODS FOR IMMERSED-HEAD CUTTING OF THERMOPLASTICS

[75] Inventors: Yves Oriot; Robert Charmey, both of Le Havre, France

[73] Assignee: ATOCHEM, Courbevoie, France

[21] Appl. No.: 627,448

[22] Filed: Jul. 3, 1984

[30] Foreign Application Priority Data

Jul. 6, 1983 [FR] France ............... 83 11256

[51] Int. Cl.$^4$ ............................................. B29C 47/12
[52] U.S. Cl. ............................ 264/142; 83/356.3; 83/675; 83/913; 425/311
[58] Field of Search ............... 425/67, 196, 311, 313, 425/69; 264/142; 83/355, 356.3, 591, 675, 913

[56] References Cited

U.S. PATENT DOCUMENTS

| | | | |
|---|---|---|---|
| 3,196,487 | 7/1965 | Snelling | 425/67 |
| 3,292,212 | 12/1966 | Pomper | 425/67 |
| 3,308,507 | 3/1967 | Black | 425/67 |
| 3,792,950 | 2/1974 | Cuff | 425/313 |
| 4,123,207 | 10/1978 | Dudley | 425/67 |
| 4,179,255 | 12/1979 | Hale | 425/67 |
| 4,251,198 | 2/1981 | Altenburg | 425/67 |

*Primary Examiner*—Jay H. Woo
*Assistant Examiner*—J. Fortenberry
*Attorney, Agent, or Firm*—Brooks Haidt Haffner & Delahunty

[57] ABSTRACT

Apparatus for cutting thermoplastic filaments or rods with multiple blades in a granulation head of the type which is completely immersed in a cooling liquid, the blades acting with an extrusion die having extrusion orifices arranged in one or more rings centered on the axis of the die and coaxial with a rotary cutting means carrying cutting blades, wherein the cutting blades have an extrados surface inscribed within a regular convex polygon having an apex angle of 7° or less and an intrados surface having a point of inflection situated at a distance between one quarter and one half of the width of the blade, the remainder of the intrados beyond the inflection point having a profile pattern similar to that of the extrados, and methods for chopping thermoplastics with such apparatus.

5 Claims, 4 Drawing Figures

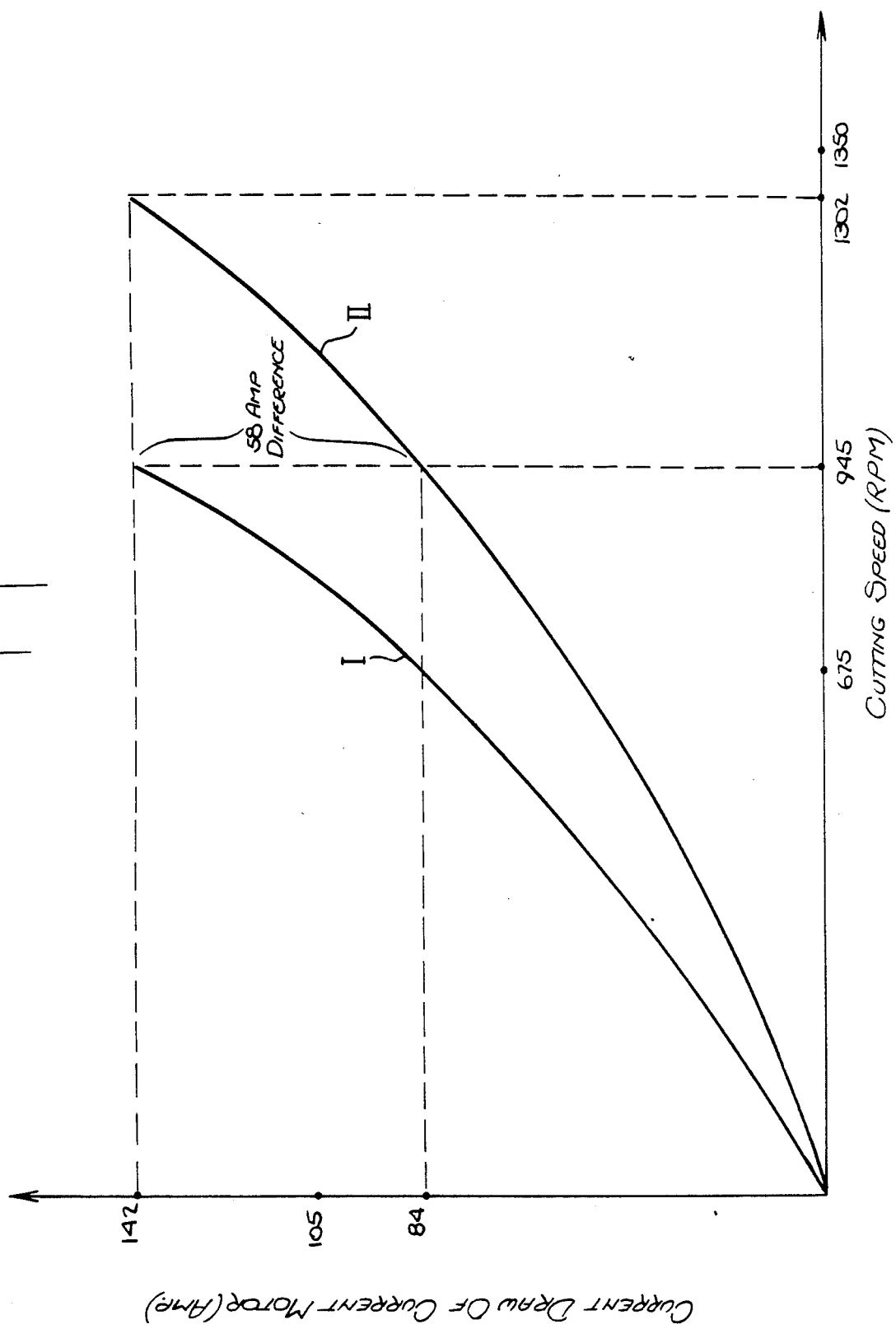

APPARATUS AND METHODS FOR IMMERSED-HEAD CUTTING OF THERMOPLASTICS

BACKGROUND OF THE INVENTION

The invention concerns methods and apparatus for cutting, and more particularly, it relates to forming pellets or granules from extruded lengths of thermoplastic material.

There are numerous types of equipment for cutting thermoplastics. The most common can be schematically described as follows: Thermoplastic material which has been melted within an extruder is forced by the extruder screw through a die provided with cylindrical orifices arranged in one line or more parallel lines or in one or more concentric rings.

In the first instance, the multiple lengths which emerge from the die can be cooled by passing them into a water bath, and solidified. They then pass into a granulator.

In the second type, a cutting head driven by a separate motor rotates a system of blades having rotational symmetry around the axis of the die, and this head cuts up the extruded lengths. The pellets of extruded material obtained are most usually flung by centrifugal force into a casing over the walls of which circulates a film of water at a high flow rate, the water being fed by a circulation pump. One improvement in such cutting apparatus involves immersing the head in a cooling liquid which is maintained in a watertight chamber fitted to the exterior surface of the die.

This chamber is completely filled by the cooling liquid, and the blade-carrying equipment occasions considerable turbulence as it rotates. It is recognized that with such submerged head apparatus, it is very important, in order to obtain the optimum cutting of pellets from the thermoplastic material, that the play between the blades and the external surface of the die be kept to a minimum. If this play becomes too great, for example, as a result of excessive wear of the blades or because of temperature and pressure variations within the material, a mediocre quality cut results, the cut is generally not clean and complete, and the quantity of fines produced increases substantially.

THE INVENTION

It has been found during research into the correlation between the quality of granulation and the output rate of granule production that, according to the present invention, providing the cutting blades with a special profile permits increasing the production rate and the aforementioned disadvantages are also obviated.

Normally, an increase in the production rate is not accompanied by an increase in quality (uniformity of pellets or granules and absence of fines) of the granules, but the novel profiling according to this invention permits the blades to operate closer to the surface of the die with a minimum of turbulence. There results a greater stability of operation of the die by the almost total elimination of vibration.

Since this turbulence is the source of parasitic resistance which brakes the rotational movement of the cutting apparatus, it will be understood that the type of blade according to the invention requires less drive power, or in the alternative, it is possible to increase the output of the granulating equipment for the same motive power fed to the equipment.

A secondary and non-negligible consequence is an increase in the longevity of the blades and the blade carriers through reduction of the corrosion caused by cavitation phenomena in the water or other cooling fluid downstream of the members. This applies particularly to the blades, which rotate along a larger diameter path than the blade carriers and, for obvious functional reasons, cannot be protected in profiled hubs.

Cavitation causes a particular type of erosion on the blades in the form of "gruyere holes" and thus reduces the cross-section of these elements. The mechanical stresses resulting from cutting the lengths of plastic material at the greatest possible speed, combined with the hydrodynamic stresses occasioned by agitation of the water, and more particularly the pressure reduction and partial vaporization of the water in the wake of the blades, eventually causes the blades to break.

The present invention will be described in greater detail by reference to the accompanying drawings, wherein:

FIG. 4 is a graph showing the operating curves of these two types of blade.

Figure 1:
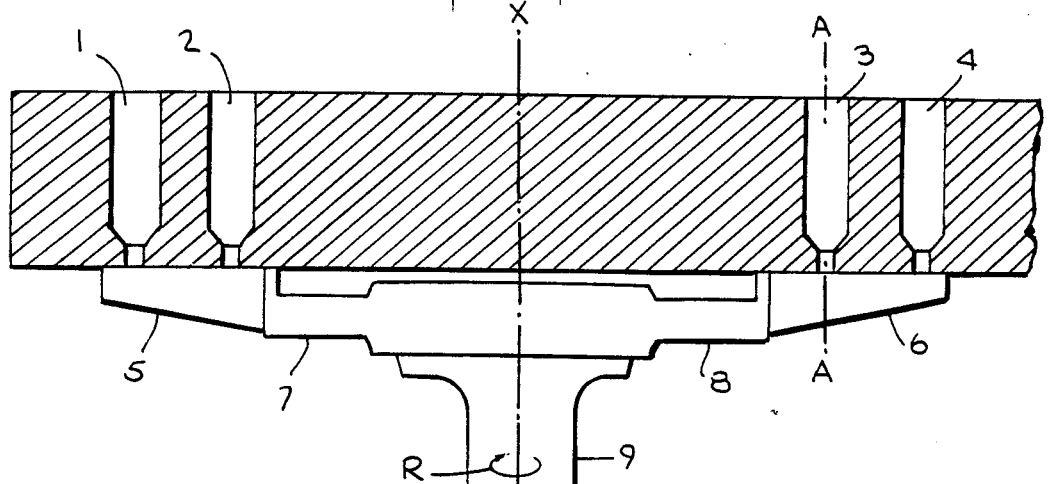
FIG. 1 is a cross-section of the die plate and the cutting apparatus.

In FIG. 1, extrusion orifices 1, 2, 3 and 4 are seen arranged in two concentric rings about axis X-Y. The plastic material emerging from these orifices is cut by blades 5 and 6 mounted on the blade carriers 7 and 8 which are rotationally driven by shaft 9 rotating about axis X-Y.

Figure 2:
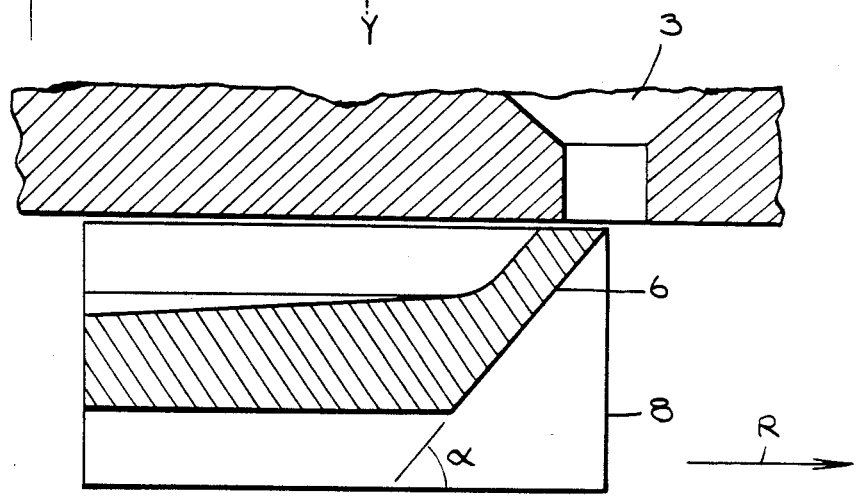
FIG. 2 is a transverse section of a conventional blade.

FIG. 2 illustrates a transverse section of a blade through the plane A—A which is perpendicular to the plane of FIG. 1, and passes through the axis of extrusion orifice 3. The blade moves within the plane of the external surface of the die plate in the direction of arrow R. Its cutting part is flat and makes an angle $\alpha$ with the plane of the die plate.

Figure 3:
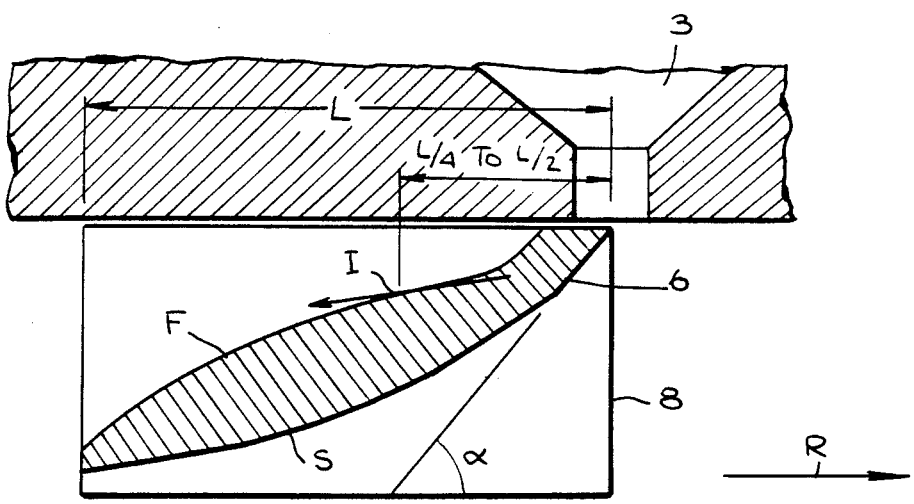
FIG. 3 is a transverse section of a blade according to the invention.

FIG. 3 shows a transverse section of a blade according to the invention, the section corresponding to that shown in FIG. 2. Opposite the die, after a straight portion limited to a few millimeters in length (1 to 3 mm), surface S begins, which surface is known as the extrados of the blade and is inscribed within regular polygonal contours the sides of which have a length of 4 to 6 mm and form between them an angle of about 6° (in other words, a 60-sided polygon).

It has been demonstrated that, for this angle, the flow lines of the water do not become detached, which detachment would give rise to the turbulence discussed hereinbefore. Such flow separation occurs at angles above 7°. Thus, the apex angle of the polygonal contour should be from 173° to 180°.

The surface located opposite the die plate, that is, intrados F of the blade, comprises, starting from the blade, a concave portion which is a simple transitional radius and a convex portion patterned like the aforementioned extrados. These two parts are separated by point of inflection I situated at a distance from the cutting edge of the blade amounting to between one-quarter and one-half of the total width of the blade. The tangent at the point of inflection is inclined to the plane of the die by an angle of from 0° to 15°. The selected profile for the intrados reduces to a minimum the blade/die interaction, which interaction is responsible for heavy energy consumption.

This interaction becomes very considerable when it is desired to bring the rotational plane of the blades and the plane of the die as close together as possible in order to satisfy the requirements of good granulation without the production of fine particles.

It has been found that the blades having the conventional profile cause a great increase in power consumption, primarily when the rotational plane of the blades is closer than one millimeter to the plane of the die face. On the other hand, it has been found that the form of blades according to the present invention is such that it tends to create a pressure in the direction of the die, without there being any actual contact, because the blade/die distance is 0.6 mm at most. It has further been discovered according to the present invention that at this distance the blade/die interaction remains moderate.

The following Example is given to illustrate an embodiment of the invention as it is presently preferred to practice it. It will be understood that this Example is illustrative, and the invention is not to be considered as restricted thereto except as indicated in the appended claims.

EXAMPLE

It is desired to granulate polypropylene having a melting index equal to 3 (3030 BN 1, sold by ATOCHEM), using a Japan Steel Type P 380-10 SW extruder having two extrusion screws arranged in series, at an average temperature of 230° C. The final extrusion screw of this combination has a diameter of 380 mm.

The die is fitted with 480 extrusion orifices and the cutting head with 16 blades. The cutting head is driven by a 55 KW motor. This motor theoretically permits attainment of a maximum velocity of 1350 RPM and an output of 15 metric tons an hour.

By referring to FIG. 4, it can be seen that the conventional blades present so much resistance to the rotational movement in the water that a current of 142 amperes is required at a rotational velocity of 945 RPM. At this velocity, the granulation output is only 10.5 metric tons an hour, as shown on curve I in FIG. 4. With the blades according to this invention, the current drawn by the motor at a velocity of 945 RPM is only 84 amperes, a substantial saving in electrical energy for the same output of 10.5 metric tons an hour. The maximum capacity of the blades according to the invention, at a maximum tolerable current of 142 amps, occurs at a rotational speed of 1302 RPM, and under these conditions, results in an output of 14.5 metric tons an hour, as shown in curve II in FIG. 4.

What is claimed is:

1. A method for producing sized thermoplastic particles which comprises extruding fluid thermoplastic from a die containing extrusion orifices arranged in one or more concentric circles centered on the die axis and immersed in a cooling liquid, cutting the thermoplastic so extruded through the die using a cutting head rotating coaxially to the die and fitted with a plurality of cutting blades, the cutting blades having an extrados surface, with respect to the die face, in the form of an inscribed convex regular polygon having a vertex angle of 173° to 180° and an intrados surface having an inflection point at a distance of from one-quarter to one-half the width of the blade, and the remainder of the intrados surface after the inflection point having a pattern substantially the same as the contour of the extrados, and cooling the thermoplastic to solidify it.

2. Cutting apparatus of the total immersion type for thermoplastics having an extrusion die containing extrusion orifices arranged in one or more concentric circles centered on the die axis and a cutting head fitted with a plurality of cutting blades, the cutting head rotating coaxially to the face of the die and spaced therefrom, and the head and the face of the die being immersed in a coolant fluid, wherein the cutting blades have an extrados surface, with respect to the die face, in the form of an inscribed convex regular polygon having a vertex angle of 173° to 180° and an intrados surface having an inflection point at a distance of from one-quarter to one-half the width of the blade, and the remainder of the intrados surface after the inflection point having a pattern substantially the same as the contour of the extrados.

3. Apparatus according to claim 2 wherein the blades are positioned with respect to the die face so that the distance between the closest edge of the blade and the die face is no greater than 0.6 mm.

4. Apparatus according to claim 2 wherein the intrados surface up to the inflection point has the form of a circular arc.

5. Apparatus according to claim 4 wherein the tangent at the point of inflection is inclined to the plane of the die face by an angle of up to 15°.

* * * * *